(12) United States Patent
Okahira et al.

(10) Patent No.: US 8,074,315 B2
(45) Date of Patent: Dec. 13, 2011

(54) CONNECTING PORTION FOR BOARDING BRIDGE AND BOARDING BRIDGE

(75) Inventors: Yukio Okahira, Hiroshima (JP); Kenji Iwamoto, Hiroshima (JP); Akira Takarada, Hiroshima (JP)

(73) Assignee: Mitsubishi Heavy Industries Transportation Equipment Engineering & Service Co., Ltd., Kanagawa (JP)

( * ) Notice: Subject to any disclaimer, the term of this patent is extended or adjusted under 35 U.S.C. 154(b) by 0 days.

(21) Appl. No.: 12/920,816

(22) PCT Filed: Jan. 21, 2009

(86) PCT No.: PCT/JP2009/050854
§ 371 (c)(1),
(2), (4) Date: Sep. 2, 2010

(87) PCT Pub. No.: WO2009/113327
PCT Pub. Date: Sep. 17, 2009

(65) Prior Publication Data
US 2010/0325818 A1   Dec. 30, 2010

(30) Foreign Application Priority Data

Mar. 10, 2008   (JP) ................................ 2008-059893

(51) Int. Cl.
*E01D 1/00* (2006.01)
(52) U.S. Cl. ...................................................... 14/71.5
(58) Field of Classification Search ........... 14/69.5–71.5
See application file for complete search history.

(56) References Cited

U.S. PATENT DOCUMENTS

| | | | | | |
|---|---|---|---|---|---|
| 4,596,826 | A | * | 6/1986 | Harigaya et al. | 514/563 |
| 5,241,722 | A | * | 9/1993 | Rohrlick et al. | 14/71.5 |
| 5,761,757 | A | * | 6/1998 | Mitchell et al. | 14/71.5 |
| 5,853,150 | A | * | 12/1998 | Kuchenbrod | 244/137.2 |

(Continued)

FOREIGN PATENT DOCUMENTS

JP   57-46239 Y2   10/1982

(Continued)

OTHER PUBLICATIONS

International Search Report dated Feb. 24, 2009 from PCT Application No. PCT/JP2009/050854 filed Jan. 21, 2009 (2 pages).

(Continued)

*Primary Examiner* — Raymond Addie
(74) *Attorney, Agent, or Firm* — Workman Nydegger (57) ABSTRACT

It is provided a connecting portion for a boarding bridge that eliminates the level difference between the doorway portion of the aircraft and the passage, reduces the anxiety of the passengers, and can be raised and lowered smoothly. A passage (27) is formed by a stationary passage (29) and an alignment passage (31) that is arranged at the distal end portion of the stationary passage (29) and adjusts the level difference between the stationary passage (29) and the doorway portion (23); the alignment passage (31) includes an elevating floor (35), on the stationary passage (29) side, having a pivot shafts (41) that is substantially perpendicular to the passenger traffic direction (T) and pivots centered on the pivot shafts (41), and an alignment floor (37), at the stationary passage (29) side, having a pivot shafts (53) that extends in a direction that is perpendicular to the passenger traffic direction (T) and that pivots centered on the pivot shafts (53); and wherein one of either the elevating floor (35) or the alignment floor (37) is installed at the stationary passage (29), the latter is installed in-plane to the former, and thereunder a sliding floor (39) that can be raised or lowered is installed in the passenger traffic direction (T).

4 Claims, 6 Drawing Sheets

U.S. PATENT DOCUMENTS

| | | | |
|---|---|---|---|
| 6,122,789 A | 9/2000 | Stephenson et al. | |
| 6,543,076 B1 * | 4/2003 | Worpenberg et al. | 14/71.5 |
| 6,691,361 B2 * | 2/2004 | Rolfe et al. | 14/71.5 |
| 6,745,423 B1 * | 6/2004 | Hutton | 14/71.5 |
| 6,802,096 B2 * | 10/2004 | Savage | 14/71.5 |
| 6,898,816 B2 * | 5/2005 | Tholen et al. | 14/71.5 |
| 6,928,684 B2 * | 8/2005 | Ratliff et al. | 14/71.5 |
| 7,168,119 B1 * | 1/2007 | Telford et al. | 14/71.5 |
| 7,188,383 B2 * | 3/2007 | Tholen et al. | 14/71.5 |
| 2003/0145400 A1 * | 8/2003 | Hinkle | 14/71.5 |
| 2005/0198750 A1 * | 9/2005 | Spencer et al. | 14/71.5 |

FOREIGN PATENT DOCUMENTS

| | | |
|---|---|---|
| JP | 63-42080 Y2 | 11/1988 |
| JP | 64-43605 A | 2/1989 |
| JP | 2004-155257 A | 6/2004 |

OTHER PUBLICATIONS

Microfilm of the specification and drawings annexed to the request of Japanese Utility Model Application No. 183096/1981 (Laid-open No. 87700/1983) (Mitsubishi Heavy Industries, Ltd.), Jun. 14, 1983 (9 pages).

\* cited by examiner

CONNECTING PORTION FOR BOARDING BRIDGE AND BOARDING BRIDGE

BACKGROUND OF THE INVENTION

1. Field of the Invention

The present invention relates to a boarding bridge that is used by passengers to board and deboard an aircraft or boat or the like, and a connecting portion for the same.

2. Description of Related Art

A boarding bridge is a tunnel-shaped walkway passage that links, for example, a terminal building of an airport and an aircraft, and enables the direct boarding and deboarding of passengers between the terminal building and the aircraft.

The distal end portion of a boarding bridge is connected to the doorway portion of the aircraft, and a walkway passage is formed by the floor portion of the doorway portion and the passage of the boarding bridge. The bottom end portion of the door of the doorway portion is positioned lower than the floor portion of the doorway portion, and thus if the level difference between the floor portion of the doorway portion and the passage of the boarding bridge is completely eliminated, the door abuts the passage and thus becomes difficult to open and close. In order for the opening and closing of the door to be carried out reliably and to provide a tolerance that takes into consideration the tracking precision, by which the boarding bridge is made to track the vertical movement of the airplane as the passengers board and deboard and the like, the position of the passage is set lower than the position of the floor portion of the doorway portion, for example, by about one-hundred and tens of millimeters.

There is a concern that passengers may trip and fall at this level difference, and in particular, passengers in wheel chairs cannot easily board and deboard an aircraft. As a solution for eliminating this problem, the invention of Japanese Unexamined Patent Application, First Publication No. 2004-155257 has been proposed. This invention provides an elevating lift, at the distal end portion of the boarding bridge, that enables the passage portion thereabove to move vertically. After connecting to the distal end portion and opening the door while the passage portion of the elevating lift is at a lower position, the passage portion is raised as necessary, for example, when passengers deboard from an aircraft. The passage portion and the floor surface of the doorway portion are set to substantially identical heights, and it is possible for the passengers to move from the aircraft without a level difference being present. After the passengers have moved to the passage portion of the elevator lift, the elevating lift is lowered so that no level difference is present between the elevating lift and the back floor surface, and then the passengers move to the terminal building. When entering the aircraft, the procedure is reversed.

BRIEF SUMMARY OF THE INVENTION

However, the invention that is disclosed in patent document 1 requires raising or lowering the elevating table each time a group of passengers pass through, and thus there is a problem in that the smooth boarding and deboarding is hindered.

In consideration of the above problems, it is an object of the present invention to provide a connecting portion for a boarding bridge that eliminates the level difference between the doorway portion of the aircraft and the passage, reduces the anxiety of the passengers, and can be raised and lowered smoothly.

In order to solve the problems described above, the present invention employs the following solution.

Specifically, a first aspect of the present invention is a connecting portion of a boarding bridge that is provided at a distal end side of a tunnel portion and that forms a passage that is connected to the doorway portion of an aircraft, wherein: the passage is formed by a stationary passage portion that is communicates with the tunnel portion and in which at least the distal end thereof can rotate in-plane, and an alignment passage portion that is arranged at the distal end portion of the stationary passage portion and adjusts the level difference between the stationary passage portion and the doorway portion; the alignment passage portion includes an elevating passage, on the stationary passage side, having a pivot axis that is substantially perpendicular to the passenger traffic direction and pivots centered on a pivot axis, and a transverse direction tilt alignment passage, at the stationary passage side, having a pivot axis that extends in a direction that is perpendicular to the passenger traffic direction and that pivots centered on the pivot axis; and wherein one of either the elevating passage or the transverse direction tilt alignment passage is installed at the stationary passage portion, the latter is installed in-plane to the former, and thereunder a sliding passage that can be raised or lowered is installed in the passenger traffic direction.

According to the present aspect, while the elevating passage and the transverse direction tilt alignment passage are pivoted downward, the length of the tunnel portion increases, and the connecting portion is positioned, or connected, so as to cover the doorway portion of the aircraft. In this situation, the positions of the elevating passage of the alignment passage portion and the transverse direction tilt alignment passage are connected by being set so as to be lower, for example, a hundred and tens of millimeters lower, than the lower end position of the floor portion of the doorway portion and the door.

In this manner, the door of the aircraft does not come into contact with the elevating passage of the alignment passage portion and the transverse direction tilt alignment passage, and thus, the door can be opened without hindrance.

In addition, after the door has been opened, the elevating passage is pivoted, and the passage surface thereof is extended so as to be positioned at the floor portion of the doorway portion. In this state, when the sliding passage is extended, the distal end of the sliding passage comes into contact with the end portion of the floor portion of the doorway portion. Thereby, the alignment passage portion forms a passage that is continuous with the floor portion of the doorway portion, and thus, the passengers, and in particular, passengers in wheel chairs, can move easily and smoothly without the presence of level differences.

In addition, because the pivot axis of the transverse direction tilt alignment passage is perpendicular to the passenger traffic direction, when the transverse direction tilt alignment passage is pivoted, for example, the height in the transverse direction differs at the distal end portion, that is, the transverse direction tilt alignment passage is tilted in the transverse direction. In addition, the degree of the tilt can be adjusted by adjusting the amount of the pivoting.

The height position of the passage portion of an aircraft varies, for example, depending on the size of the aircraft. In order to handle these heights, the tunnel portion and the connecting portion are tilted in a vertical direction. When the stationary passage rotates while they are tilted in this manner, the alignment passage portion also rotates in conformity thereto, and thus the passage of the alignment passage portion tilts in a transverse direction with respect to the doorway portion of the aircraft. In this case, the passage of the alignment passage portion is tilted by pivoting the transverse direction tilt alignment passage, and it is thereby possible to make the passage substantially parallel. In this state, by using the elevating passage and the sliding passage described above, the alignment passage portion forms a passage that is continuous with the floor portion of the doorway portion.

In this manner, because a passage is that continuous irrespective of the type of the aircraft can be formed, the occurrence of situations in which passengers trip or fall can be reduced.

In addition, the alignment of the alignment passage portion is only carried out during the initial connection and the final separation, and thus the boarding and deboarding of the passengers is carried out without hindrance, and the boarding and deboarding can be carried out smoothly.

Note that the tilting state of pivot axis of the transverse direction tilt alignment passage is selected according to the type of aircraft that to be handled.

In addition, in this state, advantageously, the left side of the pivot axis of the transverse direction tilt alignment passage, which faces the distal end of the passenger traffic direction, is positioned at the distal end side, and the right side thereof is positioned at the tunnel side.

Generally, to prevent the tunnel portion from interfering with the door of the aircraft, the stationary passage is rotated toward the left side. When the stationary passage rotates toward the left side while the distal ends of the tunnel portion and the connection portion are tilted downward, the alignment passage portion also rotates in conformity thereto, and thus the left side of the passage of the alignment passage portion becomes lower when viewed from the tunnel portion.

According to the present invention, when the transverse direction tilt alignment passage pivots upward, the transverse direction tilt alignment passage faces the distal end side in the passenger traffic direction, the right side thereof is high and becomes lower as it moves toward the left side, and thus, it is possible to handle this state.

In addition, in the aspect described above, advantageously, a shock-absorbing portion that is formed by an elastic member is provided at the distal end portion of the sliding passage.

In this manner, even if the slide passage abuts the aircraft, the shock-absorbing portion reduces the shock, and thus, it is possible to reduce the occurrence of damage.

In addition, a second aspect of the present invention is a boarding bridge in which the connecting portion according to the first aspect is provided at the distal end side of the tunnel portion.

In this manner, the connecting portion forms a passage from the aircraft in which level differences are not present, and thus the passengers can board and deboard with peace of mind, safely, and easily.

In addition, the alignment of the alignment passage portion is only carried out during the initial connection and the final separation, and thus the boarding and deboarding of the passengers can be performed without hindrance and smoothly.

According to the present invention, the passage is formed by the stationary passage portion and the alignment passage portion; the alignment passage portion is provided with an elevating passage that has, at the stationary passage side, a pivot axis that is perpendicular to the passenger traffic direction and a transverse direction tilt alignment passage that has, at the stationary passage side, a pivot axis that extends in a direction that is perpendicular to the passenger traffic direction; and one of either the elevating passage or the transverse direction tilt alignment passage is installed at the stationary passage portion, the latter is installed in-plane to the former, the sliding passage that can be raised or lowered in the passenger traffic direction is installed thereunder, and thus a passage that is continuous from the floor portion of the doorway portion is formed, and the apprehensions of the passengers can be allayed.

In addition, when transferring from the aircraft to the connecting floor, it is possible to prevent the possibility of falling even without warning the passengers, and the safety can be improved.

Furthermore, the alignment of the alignment passage portion is only carried out during the initial connection and the final separation, and thus the boarding and deboarding of the passengers is not hindered, and it is possible to carry out the loading smoothly.

BRIEF EXPLANATION OF THE REFERENCE SYMBOLS 1 boarding bridge
7 proximal end tunnel
9 distal end tunnel
11 head
12 aircraft
23 doorway portion
26 door
27 passage
29 stationary passage
31 alignment passage
35 elevating floor
37 alignment floor
39 sliding floor 41 pivot axle
79 shock absorbing member
T passenger traffic direction

DETAILED DESCRIPTION OF THE INVENTION

Below, a boarding bridge 1 for an embodiment of the present invention, in which the tunnel part that extends and retracts is formed by two tunnels, will be explained as one example with reference to FIG. 1 to FIG. 12.

Figure 1:
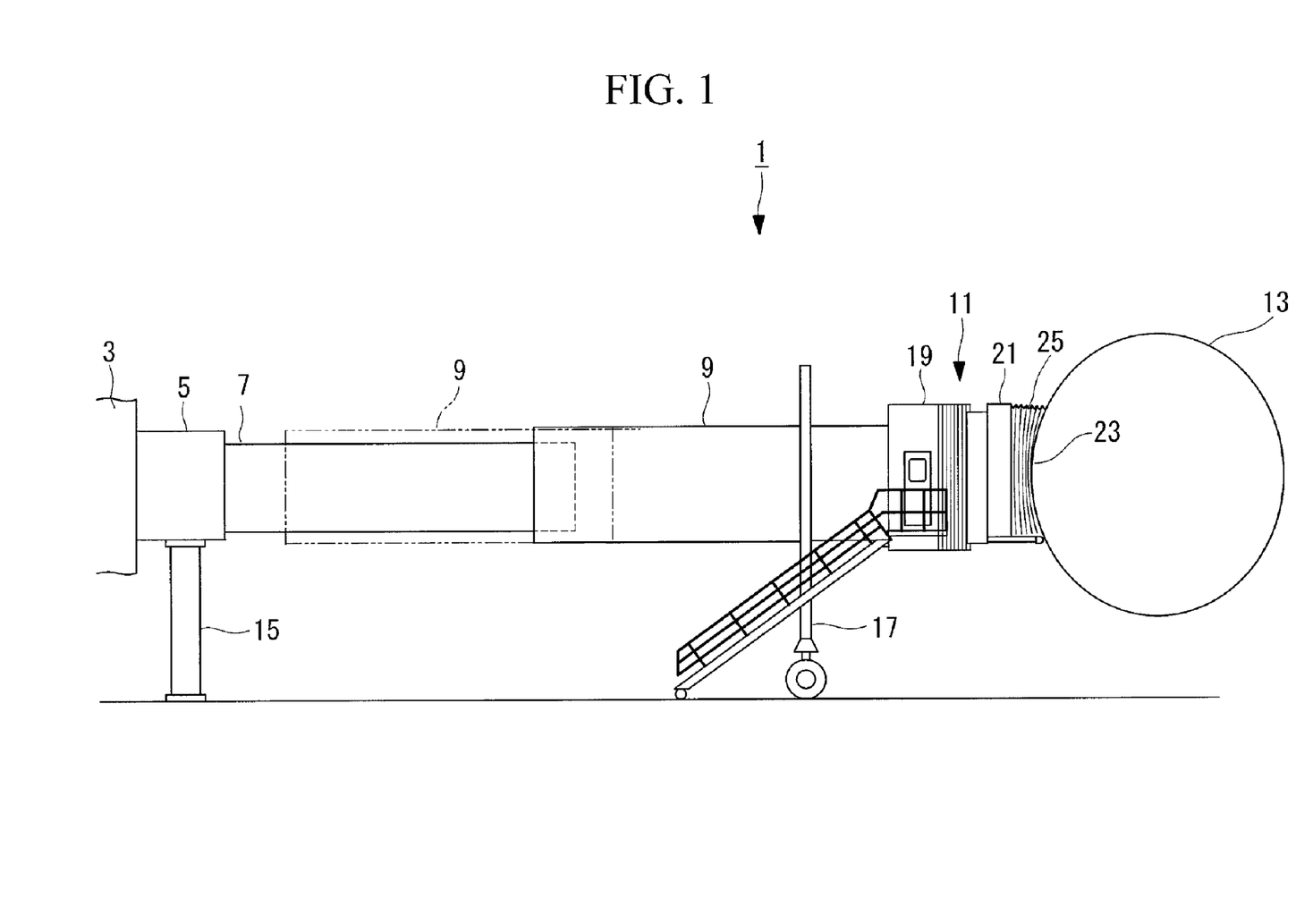
FIG. 1 is a frontal view that shows the overall schematic structure of the boarding bridge according to an embodiment of the present invention.
Figure 2:
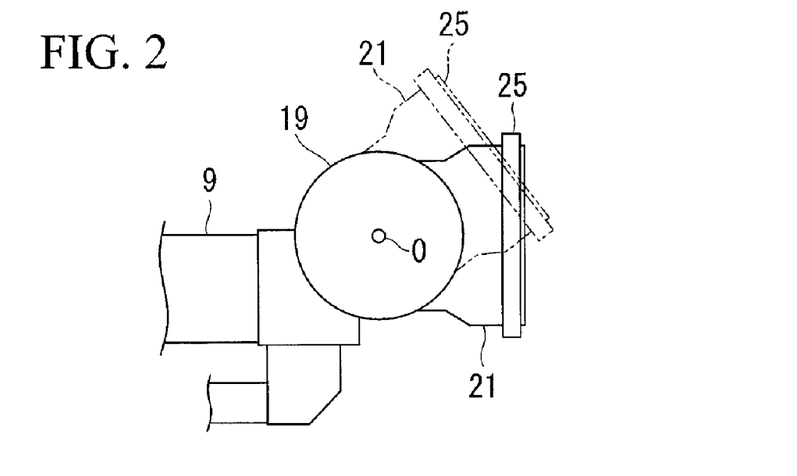
FIG. 2 is a partial plan view that shows the distal end portion of the boarding bridge according to an embodiment of the present invention.

FIG. 1 is a frontal view that shows the overall schematic structure of a boarding bridge 1. FIG. 2 is a partial plan view that shows the distal end portion of the boarding bridge 1.

The boarding bridge 1 connects a terminal building of an airport and an aircraft 13, forms a walkway for passengers (passenger traffic) between the terminal building and the aircraft 13, and enables direct boarding and deboarding.

The boarding bridge 1 is provided with a rotunda 5 that is provided so as to be attached to a stationary bridge 3 that leads to the terminal building; a proximal end tunnel (tunnel portion) 7 that is connected to the rotunda 5 so as to be rotatably movable in a horizontal direction; a distal end tunnel (tunnel portion) 9 that fits telescopically over the distal end side of the proximal end tunnel 7; and a head (connecting portion) 11 that is provided at the distal end portion of the distal end tunnel 9.

A stationary leg 15 that is disposed by being attached to the ground is provided under the rotunda 5. A movable leg 17 is provided at the distal end side, in a longitudinal direction, of the distal end tunnel 9.

The boarding bridge 1 is supported by the stationary leg 15 and the movable leg 17.

The movable leg 17 is a structure that extends and retracts in a vertical direction, and the boarding bridge 1 pivots in a vertical direction by extending and retracting the movable leg 17 by using a drive source (not illustrated).

The proximal end tunnel 7 and the distal end tunnel 9 are each shaped as a hollow rectangular column. In the proximal end tunnel 7 and the distal end tunnel 9, steel structural beams are disposed at each of the edges of the rectangular column, aluminum alloy panels, for example, are attached to both side surfaces and the upper and lower surfaces so as to link the structural beams, and thereby a tubular shape is formed. The panels may by formed, for example, by steel, resin, or a transparent material (resin or glass or the like).

The cross-sectional area of the hollow portion of the distal end tunnel 9 is formed so as to be larger than the cross-sectional area of the proximal end tunnel 7. The hollow portion of the distal end tunnel 9 is formed so as to guide the outer peripheral surface of the distal end tunnel 7. The distal end tunnel 9 moves in a longitudinal direction N as the movable leg 17 moves, and the length of the boarding bridge 1 thereby increases and decreases. The change in the distance between the rotunda 5 and the aircraft 13 is accommodated by this increase and decrease.

The rotunda 5, the proximal end tunnel 7, and the distal end tunnel 9 are provided with a passage (not illustrated) substantially along the entire length thereof on which the passengers pass.

The head 11 is provided with a head body 19 that is installed at the distal end portion of the distal end tunnel 9 and a linking portion 21 that links the head body 19 and the doorway portion 23 of the aircraft 13.

The head body 19 has a substantially tubular shape, and the axis of the tubular shape extends in a vertical direction. The linking portion 21 has a substantially rectangular shape. The head body is formed so as to rotate centered on the center point O. Accompanying the rotation of the head body 19, as shown in FIG. 2, the linking portion 21 carries out an oscillating movement within a constant angular range. A linking section 25, which is provided at the distal end portion of the linking portion 21, extends and retracts in a longitudinal direction due to having a bellow structure, covers the periphery of the doorway portion 23 such that the door 26 can be opened, and is in close contact along the skin of the aircraft 13.

Figure 3:
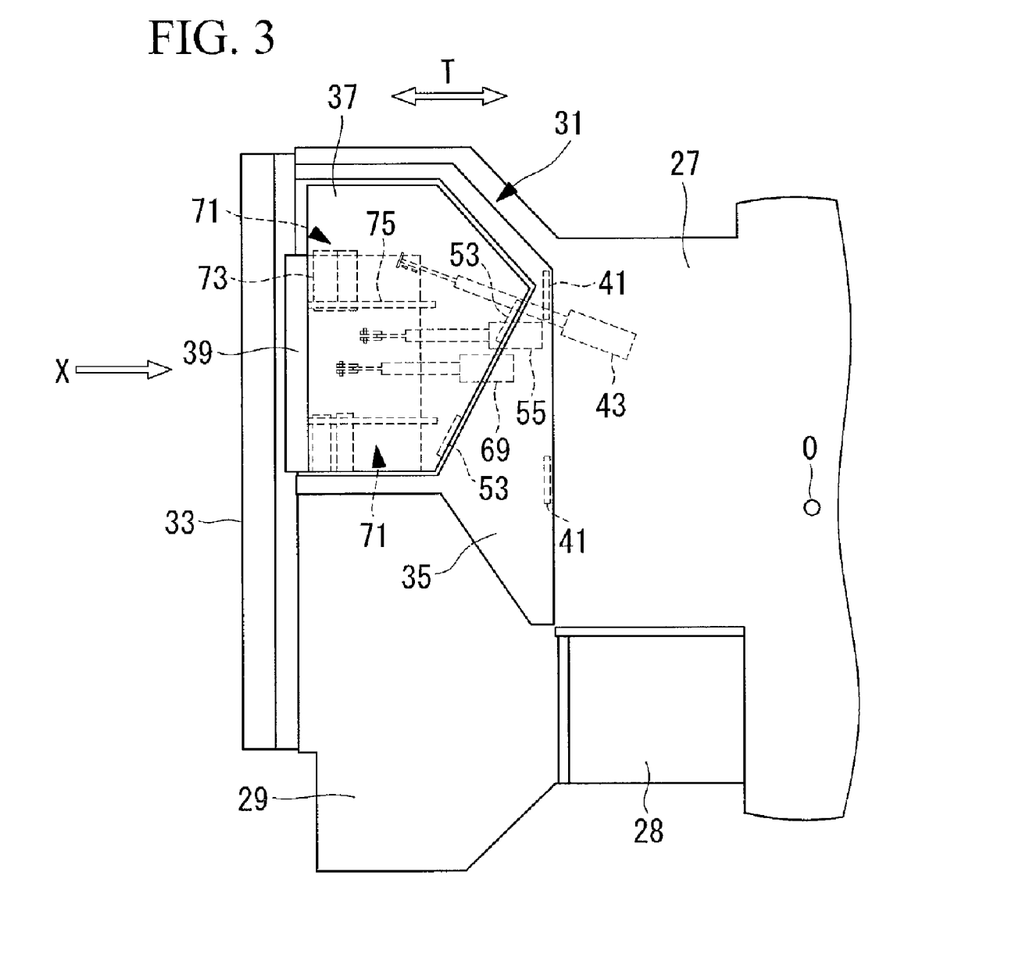
FIG. 3 is a plan view that shows the alignment passage according to an embodiment of the present invention.

FIG. 3 is a partial plan view that shows the passage 27 that is inside of the head 11.

The passage 27 is provided with a stationary passage 29, an alignment passage 31, and a rubber damper 33.

The stationary passage 29 is arranged so as to traverse the head body 19 and the linking portion 21, and rotates along with the rotation of the head body 19. Note that the linking portion 21 may rotate around the head body 19, and in this case, only the stationary passage 29 that is positioned at the linking portion 21 rotates.

In order to connect the terminal building and the aircraft 13, an operating control panel 28 that is used to operate the boarding bridge 1 is provided at a side portion of the stationary passage 29.

The rubber damper 33 is installed at the lower portion of the distal end of the stationary passage 27 over substantially the entire width thereof so as to protrude from the stationary passage 29. The rubber damper 33 functions to reduce the shock when the stationary passage 27 brought into contact with the aircraft 13 and to maintain the separation between the distal end portion of the alignment passage 31 and the doorway portion 23.

An elevating floor (elevator passage) 35, an alignment floor (transverse direction tilt alignment passage) 37, and a sliding floor (sliding passage) 39 are provided in the alignment passage 31.

The elevating floor 35 is installed at the stationary passage 29 such that the distal end side pivots in a vertical direction due to the pivot shafts (pivoting axis) 41.

The direction of the extension of the pivot shafts 41 is disposed so as to be substantially perpendicular to the passenger traffic direction T. Therefore, the pivot shafts 41 are arranged so as to be substantially parallel to the rubber damper 33.

Figure 4:
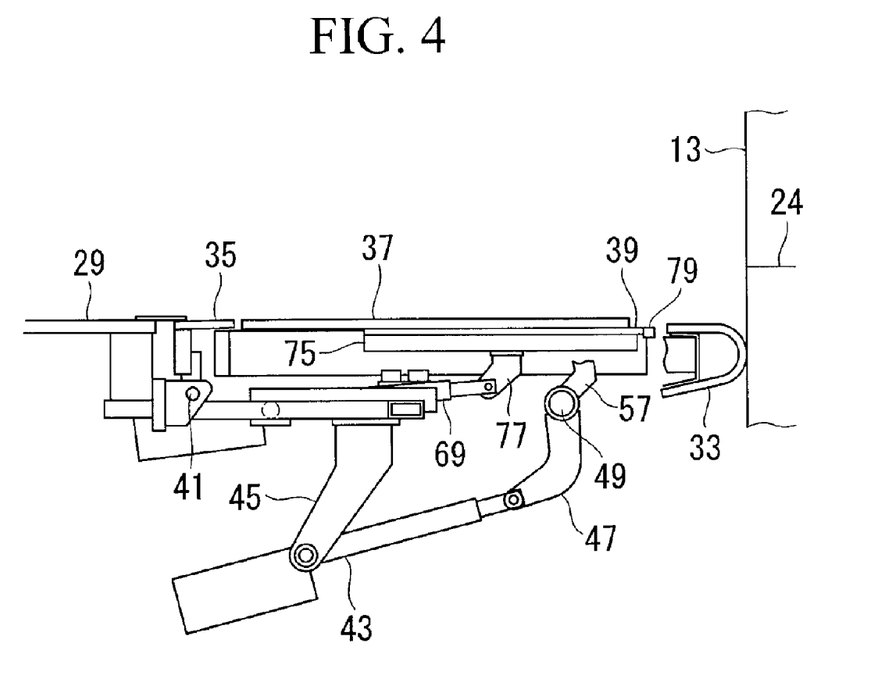
FIG. 4 is a side view that shows a portion of the alignment passage according to an embodiment of the present invention.

As shown in FIG. 4, a screw cylinder 43, which has a motor to rotate an internal threading and thereby extends and retracts an external threading, is installed at the stationary passage 29 by a bracket 45. An "L"-shaped lever 47 is installed at the distal end that is extended and retracted by the screw cylinder 43. The distal end of the lever 47 is attached to a shaft 49 that is freely rotatably supported at the stationary passage 29 side. One end of the lever 57 is attached to the shaft 49, and the other end thereof is attached to the elevating floor 35.

The shaft 49 rotates via the lever 47 due to the extension and retraction of the screw cylinder 43, and due to the pivoting of the lever 51, the elevating floor 35 pivots in a vertical direction centered on the pivot shafts 41.

The distal end side of the alignment floor 37 is substantially parallel to the rubber damper 33, and the head body 19 side, that is, the distal end tunnel 9 side, forms a pentagon with a peak in the shape of a triangle. The alignment floor 37 is disposed inside of the elevating floor 35. Specifically, except at the edge on the distal end side thereof, the alignment floor 37 is disposed so as to be enclosed by the elevating floor 35, and so as to be flush with the elevating floor 35.

The alignment floor 37 is installed within the elevating floor 35 such that the distal end side pivots in a vertical direction due to the pivot shafts (pivot axes) 53. The pivot shafts 53 are disposed inside the edge of the alignment floor 37 on the head body 19 side so as to face the distal end side of in the passenger traffic direction, and the right side thereof is disposed along the edge that is near the head body 19 side. Therefore, the pivot shafts 53 are disposed so as to extend in a direction that is perpendicular to the passenger traffic direction T.

Figure 5:
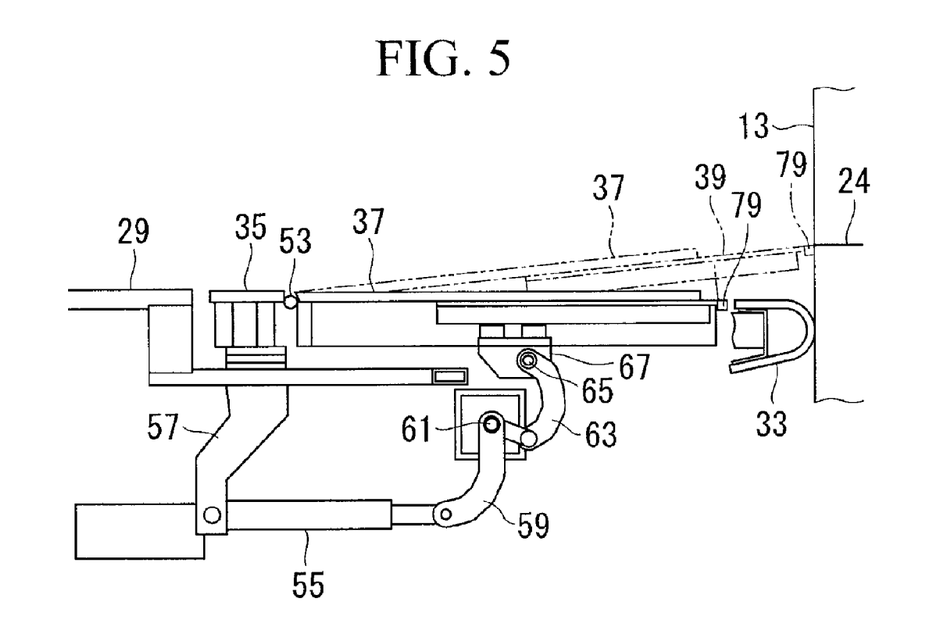
FIG. 5 is a side view that shows a portion of an alternative alignment passage according to an embodiment of the present invention.

As shown in FIG. 5, the screw cylinder 55, which has a motor to rotate an internal threading to extend and retract an external threading, is installed on the elevating floor 35 by the bracket 57. An arc-shaped lever 59 is installed at the distal end that extends and retracts the screw cylinder 55. The end portion of the lever 59 is attached to a shaft 61, which is freely rotatably supported at the elevating floor 35 side. One end of the arc-shaped lever 63 is installed freely rotatably on a projecting portion of the shaft 61, and the other end thereof is installed freely rotatably on a shaft 65 that is supported by the bracket 67 that is attached to the alignment floor 37.

The shaft 61 rotates via the lever 59 due to the extension and retraction of the screw cylinder 55, and the alignment floor 37 pivots in a vertical direction centered on the pivot shafts 53 due to the lever 63 being raised.

The sliding floor 39 is a plate member having a substantially rectangular shape, and is installed under the alignment floor 37 so as to be freely raised and lowered in the passenger traffic direction T due to guiding mechanisms 71.

Each guiding mechanism 71 is formed by a guiding portion 73 that is installed by being attached to the alignment floor 37 and a guiding plate 75 that is installed under the sliding floor 39 so as to extend along the passenger traffic direction T.

A rubber shock-absorbing member 79 is installed at the distal end portion of the sliding floor 39 along substantially the entire width thereof.

The operation of the boarding bridge 1 according to the present embodiment that has been explained above will now be explained.

The boarding bridge 1 is in standby mode when the most of the proximal end tunnel 7 is fit into the distal end tunnel 9, as shown by the two-dot chain line in FIG. 2, that is, the length of the boarding bridge 1 is reduced.

When the aircraft 13 arrives, the movable leg 17 is operated, and the distal end tunnel 9 moves toward the aircraft 13. That is, the boarding bridge 1 is extended. At this time, the elevating floor 35 pivots downward so as to become flush with the stationary passage 29.

In the case of a mid-sized or a large-body aircraft 13, as shown in FIG. 1, the boarding bridge 1 extends so as to be substantially parallel to the ground. In this case, the head 11 approaches the doorway portion 23 of the aircraft 13, and when the linking section 25 of the linking portion 21 reaches a predetermined position opposing the doorway portion 23, that is, a position at which the rubber damper 33 abuts the aircraft 13, the extension and movement of the boarding bridge 1 is stopped.

At this time, the height positions of the stationary passage 29 of the head body 19 and the alignment passage 31 are positioned, for example, about 100 to 150 mm below the height position of the floor portion 24 of the doorway portion 23, as shown in FIG. 4 and FIG. 5. This distance is one example, and for example, the distance may also be set to 200 to 300 mm.

In this state, the linking section 25 is extended to the aircraft 13 side, and the distal end thereof is brought into close contact along the skin of the aircraft 13.

In this manner, when the head 11 connects to the aircraft 13, the door 26 of the doorway portion 23 is opened.

At this time, because the alignment passage 31 is pivoted downward, that is, becomes positioned sufficiently lower than the floor portion 24, the door 26 can be opened without hindrance.

After the door 26 has been opened, the screw cylinder 43 is extended, the elevating floor 35 is pivoted upward such that the extension of the upper surface of the elevating floor 35 is positioned at the distal portion of the floor portion 24.

Next, the screw cylinder 69 is extended, and the sliding floor 39 is advanced forward until the shock-absorbing member 79 abuts the aircraft 13.

These operations can be visually performed by an operator. In this case, because the screw cylinders 43 and 69 are small, they can easily be finely adjusted.

Thereby, because a passage is formed that is continuous from the floor portion 24 of the doorway portion 23 to the stationary passage 29, passengers, and in particular, passengers in wheel chairs, can move easily from the aircraft 13 to the head 11 without the presence of any level differences. In addition, the occurrence of situations such as the passengers tripping or falling can be reduced, and the passengers can pass safely without worrying about tripping or falling.

When the passage of the passengers has completed, the boarding bridge 1 returns to the standby position by reversing the procedure that has been described above.

In this manner, the alignment of the alignment passage 31 is only carried out during the initial connection and the final separation, and thus the boarding and deboarding of passengers is not hindered, and thereby, the boarding and deboarding of the passengers can be carried out smoothly.

Next, the case in which the linking portion 21 is rotated and connected to a small aircraft 13 on the left side, as shown by the two-dot chain line in FIG. 2, will be explained with reference to FIG. 9 to FIG. 12.

Because the doorway portion 23 of a small aircraft 13 is at a low position, the boarding bridge 1 is extended while the movable leg is retracted and the distal end is tilted downward.

Figure 9:
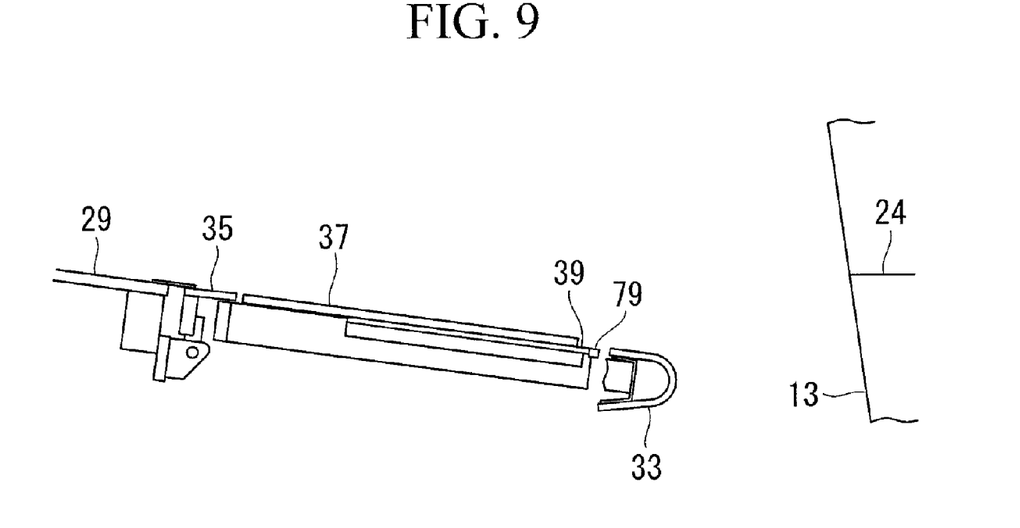
FIG. 9 is a partial side view that shows the connection procedure for a small aircraft according to an embodiment of the present invention.

In this case, as shown in FIG. 9, when the head 11 approaches the doorway portion 23 of the aircraft 13, at a position slightly separated from the aircraft 13, for example, at a position separated by about 500 mm, the extension of the boarding bridge 1 is stopped.

Next, the degree of parallelism between the sliding floor 39 and the floor portion 24 is adjusted.

Figure 6:
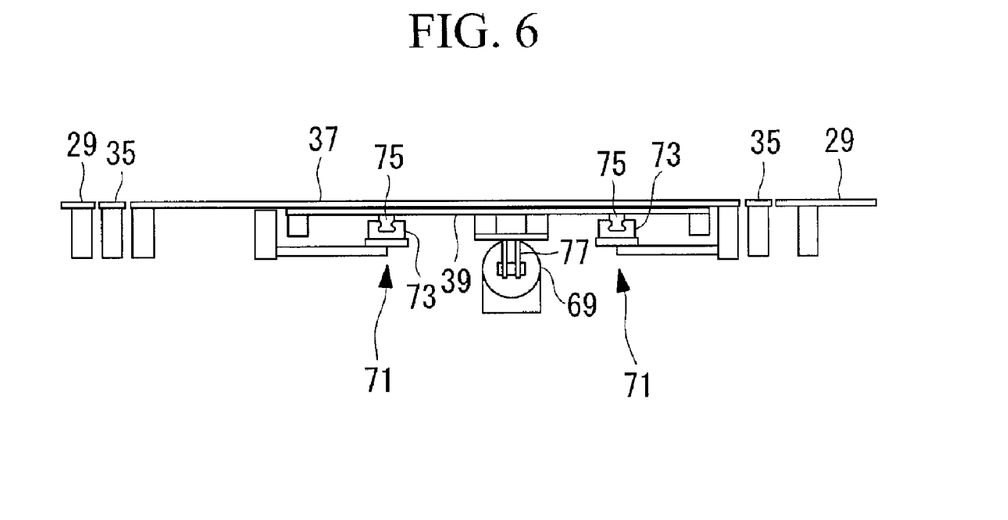
FIG. 6 is a view along line X in FIG. 3.
Figure 7:
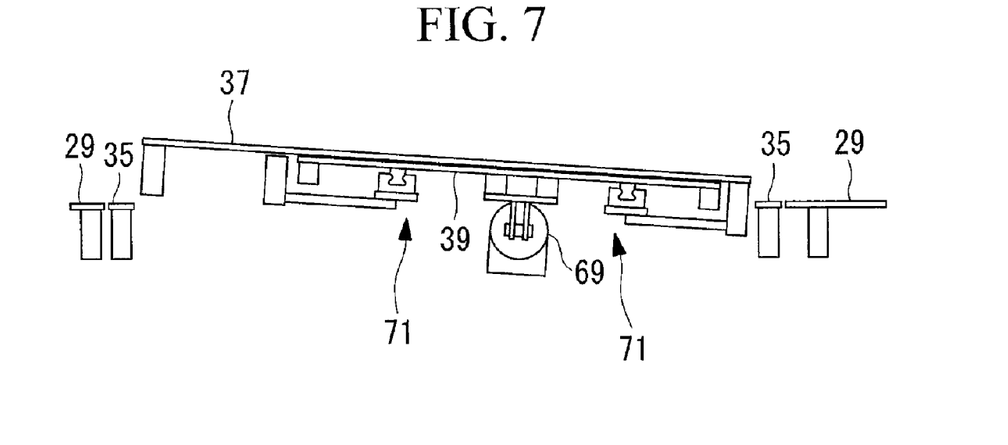
FIG. 7 is a perspective view along line X in FIG. 3 that shows the operation of the alignment floor according to an embodiment of the present invention.

When the screw cylinder 55 is extended and the alignment floor 37 pivots upward from the state that is shown in FIG. 6, viewed from the head body 19 side, the head body 19 having a large pivoting radius, the right side thereof is high in comparison to the left side, as shown in FIG. 7.

Figure 8:
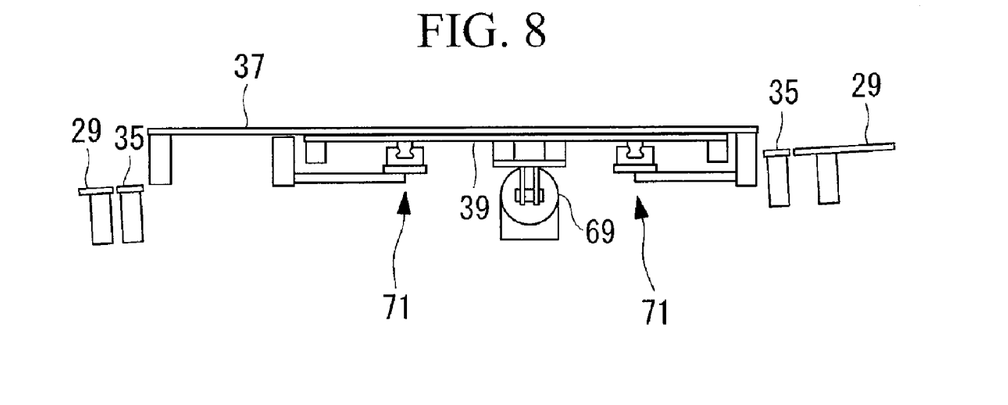
FIG. 8 is a perspective view along line X in FIG. 3 that shows the operation of the alignment floor according to the embodiment of the present invention.

When the distal end tilts downward and the linking portion 21 rotates toward the left side, as shown in FIG. 8, the passage surfaces of the stationary passage 29 and the alignment passage 31 are tilted such that, when viewed from the aircraft 13 side, the left side has lowered (when viewed from the head body 19 side, tilted such that the right side is lowered). In this state, when the alignment floor 37 pivots a predetermined amount upward, as shown in FIG. 8, the alignment floor 37 can be made substantially horizontal, that is, substantially parallel to the floor portion 24.

Figure 10:
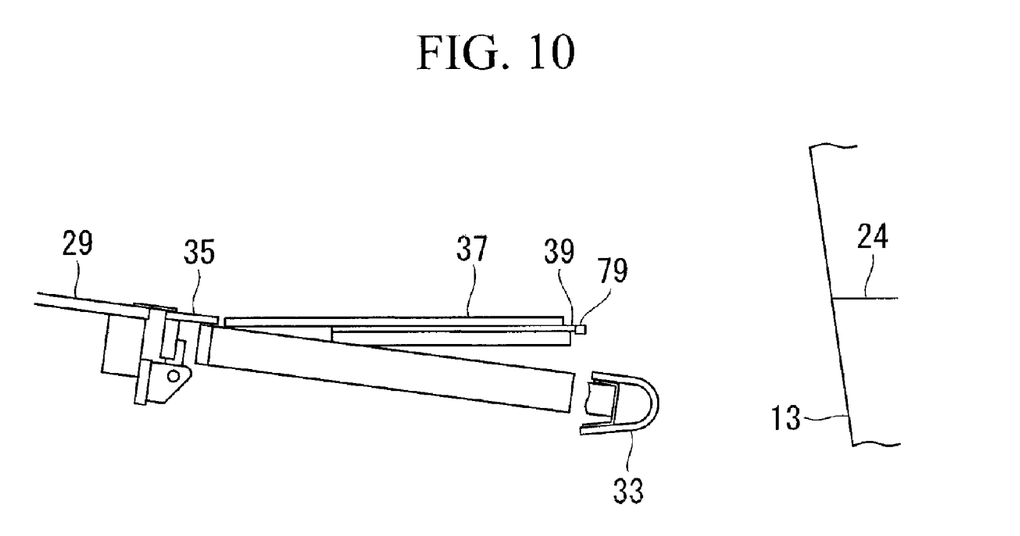
FIG. 10 is a partial side view that shows the connection procedure for a small aircraft according to an embodiment of the present invention.

In FIG. 10, this state is viewed from the side.

Then the boarding bridge 1 is again extended, the head 11 approaches the doorway portion 23 of the aircraft 13, and when the rubber damper 33 reaches a position abutting the aircraft 13, the extension and movement of the boarding bridge 1 is stopped.

Then the linking section 25 is extended toward the aircraft 13 side, and the distal end thereof is in close contact with the skin of the aircraft 13.

In this manner, when the head 11 is in contact with the aircraft 13, the door 26 of the doorway portion 23 is opened.

At this time, the alignment passage 31 is pivoted downward, that is, positioned sufficiently lower than the floor portion 24, and thus the door 26 can be opened without hindrance.

Figure 11:
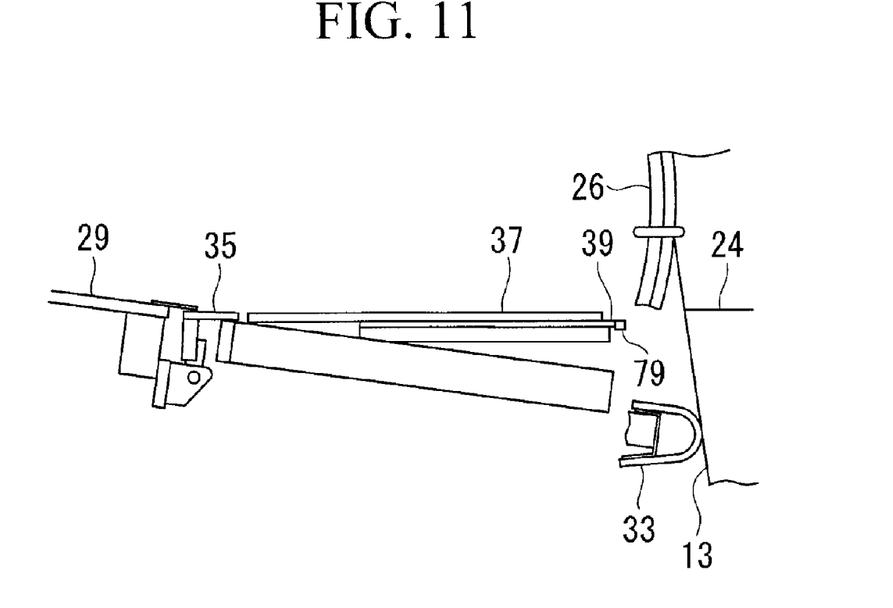
FIG. 11 is a partial side view that shows the connection procedure for a small aircraft according to an embodiment of the present invention.

After the door 26 has been opened, the screw cylinder 43 is extended, the elevating floor 35 pivots upward such that the extension of the upper surface of the elevating floor 35 is positioned at the distal portion of the floor portion 24 (refer to FIG. 11).

Figure 12:
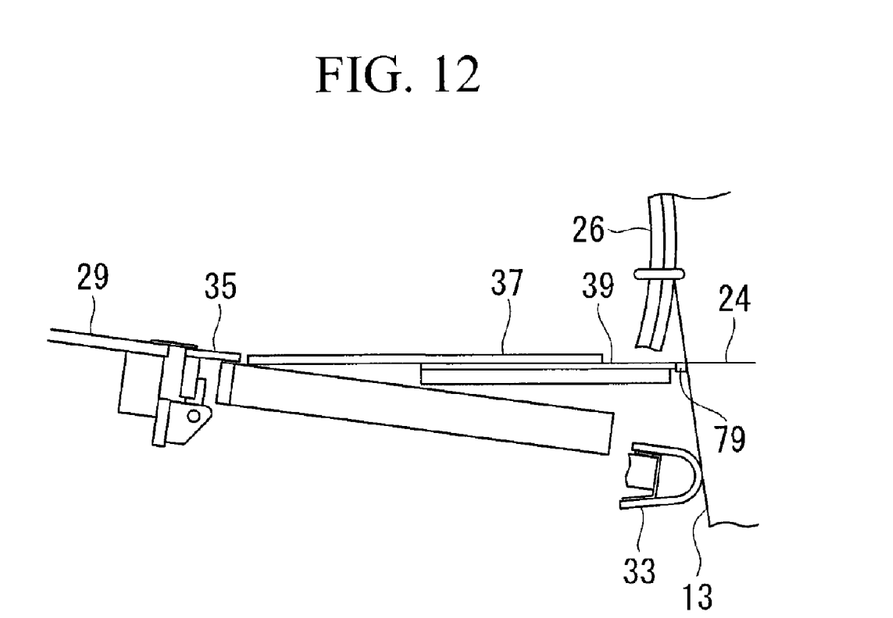
FIG. 12 is a partial side view drawing that shows the connecting procedure for a small aircraft according to an embodiment of the present invention.

Next, as shown in FIG. 12, the screw cylinder 69 is extended, and the sliding floor 39 is advanced until the shock-absorbing member 79 abuts the aircraft 13.

These operations can be visually performed by an operator. In this case, because the screw cylinders 43, 55, and 69 are small, they can easily be finely adjusted.

Thereby, a passage is formed that is continuous from the floor portion 24 of the doorway portion 23 to the stationary passage 29, and thus the passengers, and in particular, passengers in wheel chairs, can easily move from the aircraft 13 to the head 11 without the presence of any level differences. In addition, the occurrence of situations such as the passengers tripping or falling can be reduced, and the passengers can pass safely without worrying about tripping or falling.

When the passage of the passengers has completed, the boarding bridge 1 is returned to the standby position by reversing the procedures described above.

In this manner, the alignment of the alignment passage 31 is only carried out during the initial connection and the final separation, and thus the boarding and deboarding of passengers can be carried out without hindrance. Thereby, the boarding and deboarding of passengers can be carried out smoothly.

Note that it is even more advantageous if the passage from the rotunda 5 to the distal end tunnel 9 is connected to the passage of the head 11.

Also note that in the present embodiment, the alignment floor 37 is installed at the elevating floor 35. However, the alignment floor 37 may be installed at the stationary passage 29, and the elevating floor 35 may be installed within the alignment floor 37. In this case, the sliding floor 39 can be installed at the elevating floor 35.

Note furthermore that the present invention is not limited to the embodiments described above, and may be suitably modified within a range that does not depart from the gist of the present invention.

For example, the present invention may also be applied to a boarding bridge 1 that is provided with a suitable number of intermediate tunnels between the proximal end tunnel 7 and the distal end tunnel 9.

What is claimed is:

1. A connecting portion for a boarding bridge that is provided at the distal end side of a tunnel portion and forms a passage that connects to the doorway portion of an aircraft, wherein the passage comprises a stationary passage portion that communicates with the tunnel portion and at least the distal end portion thereof can rotate in-plane, and an alignment passage portion that is arranged at the distal end portion of the stationary passage portion and adjusts level differences between the stationary passage portion and the doorway portion;

the alignment passage portion comprises an elevating portion, at the stationary passage portion side, that has a first pivot axis that is substantially perpendicular to the passenger traffic direction and pivots centered on the first pivot axis, and a transverse direction tilt alignment passage, at the stationary passage portion side, that has a second pivot axis that extends in a direction that is perpendicular to the passenger traffic direction and tilts with respect to the first pivot axis so as to face the distal end side in the passenger traffic direction, the left side of the second pivot axis being positioned at the distal end side, the right side of the second pivot axis being positioned at the tunnel side, and the transverse direction tilt alignment passage pivots centered on the second pivot axis; and wherein one of either the elevating passage or the transverse direction tilt alignment passage is installed at the stationary passage portion, and the latter is installed in-plane to the former, and a sliding passage that can be raised and lowered is installed thereunder in the passenger traffic direction.

2. A connecting portion for a boarding bridge according to claim 1, wherein a shock-absorbing portion that is formed of an elastic material is provided at the distal end portion of the sliding passage.

3. A boarding bridge wherein the connecting portion recited in claim 1 is provided at the distal end of the tunnel portion.

4. A boarding bridge wherein the connecting portion recited in claim 2 is provided at the distal end of the tunnel portion.

* * * * *